(12) United States Patent
Nishiyama et al.

(10) Patent No.: US 6,169,826 B1
(45) Date of Patent: Jan. 2, 2001

(54) OPTICAL SWITCH

(75) Inventors: Toshikazu Nishiyama; Masahiro Mita, both of Fukaya; Yoshiji Totsuka, Kumagaya; Miki Nakategawa, Tokyo; Kazutaka Sato, Kashiwa; Masaya Horino, Ibaraki-ken; Yasuo Aida, Yokohama, all of (JP)

(73) Assignee: Hitachi Metals, Ltd., Tokyo (JP)

( * ) Notice: Under 35 U.S.C. 154(b), the term of this patent shall be extended for 0 days.

(21) Appl. No.: 09/306,991

(22) Filed: May 7, 1999

(30) Foreign Application Priority Data

May 12, 1998 (JP) .................................................. 10-128993

(51) Int. Cl.[7] ...................................................... G02B 6/26
(52) U.S. Cl. ............................................... 385/22; 385/16
(58) Field of Search ................................. 385/16, 22, 23, 385/25, 31, 32, 50

(56) References Cited

U.S. PATENT DOCUMENTS 6,044,186 * 3/2000 Chang et al. ........................... 385/22

FOREIGN PATENT DOCUMENTS

| 63-85522 | 4/1988 | (JP) . |
| 6-208062 | 7/1994 | (JP) . |
| 10-227986 | 8/1998 | (JP) . |
| 10-268212 | 10/1998 | (JP) . |

* cited by examiner

Primary Examiner—James Phan
(74) Attorney, Agent, or Firm—Finnegan, Henderson, Farabow, Garrett & Dunner

(57) ABSTRACT

In an optical switch for connecting optically a first optical fiber supported on a stationary supporting block to a second optical fiber supported on a movable supporting block being movable relative to the stationary supporting block between a first position for the optical connection between the terminating ends of the first and second optical fibers and a second position for disconnecting the optical connection therebetween and being adjacent to the stationary supporting block, and a magnetic flux generator for generating a magnetic flux for moving the movable supporting block relative to the stationary supporting block, the movable supporting block includes a soft magnetic substance so that the magnetic flux passes through the movable supporting block.

22 Claims, 4 Drawing Sheets

OPTICAL SWITCH

BACKGROUND OF THE INVENTION AND RELATED ART STATEMENT

The present invention relates to an optical switch by which an optical fiber is optically connected to another optical fiber selectively as required.

In a prior art optical switch disclosed in JP-A-6-208062, a magnetic member mounted on a movable optical fiber is magnetized by a coil surrounding the magnetic member to be urged toward either of permanent magnets arranged respective radial sides of the coil opposite to each other so that the movable optical fiber is displaced to be optically connected to either of stationary optical fibers selectively.

OBJECT AND SUMMARY OF THE INVENTION

An object of the present invention is to provide an optical switch for connecting optically a first optical fiber to a second optical fiber selectively as required, in which switch a switching operation is securely performed while a size of the optical switch is kept small.

In an optical switch for connecting optically at least one first optical fiber to at least one second optical fiber selectively, comprising, a stationary supporting block for supporting thereon a terminating end of the first optical fiber (the terminating end may project slightly from the stationary supporting block or may be completely surrounded by the stationary supporting block), a movable supporting block for supporting thereon a terminating end of the second optical fiber (the terminating end may project slightly from the movable supporting block or may be completely surrounded by the movable supporting block), being movable relative to the stationary supporting block between a first position for the optical connection between the terminating ends of the first and second optical fibers and a second position for disconnecting the optical connection therebetween, and being adjacent to the stationary supporting block, and a magnetic flux generator for generating a magnetic flux for moving the movable supporting block relative to the stationary supporting block.

According to the present invention, since the movable supporting block guided to be adjacent to the stationary supporting block includes a soft magnetic (feeble magnetism) substance so that the magnetic flux passes through the movable supporting block, the movable supporting block supporting thereon the terminating end of the second optical fiber is driven by the magnetic flux relative to the stationary supporting block adjacently or close to the stationary supporting block. Therefore, the terminating end of the second optical fiber is securely driven and correctly positioned relative to the terminating end of the first optical fiber, and the magnetic flux is effectively utilized to drive the movable supporting block so that a size of the magnetic flux generator, that is, a size of the optical switch is minimized.

If the soft magnetic substance of the movable supporting block is a soft magnetic ceramic (ceramic of feeble magnetism), a difference in expansion and contraction caused by temperature variation between the movable supporting block and the second optical fiber is made small while preventing a deterioration of a magnetic characteristic of the movable supporting block. If the stationary supporting block includes a ceramic having at least one of soft (feeble) magnetism and ferromagnetism, a difference in expansion and contraction caused by temperature variation between the stationary supporting block and the first optical fiber is made small while preventing a deterioration of a magnetic characteristic of the stationary supporting block. It is preferable for a thermal expansion coefficient of the stationary supporting block to be substantially equal to that of the movable supporting block, for maintaining a positional relationship between the first and second optical fibers correctly against the temperature variation of the optical switch. If the stationary supporting block includes at least one of a ceramic and a glass so that a difference in thermal expansion coefficient between the stationary supporting block and the first optical fiber is kept small, a thermal stress of at least one of the stationary supporting block and the first optical fiber is restrained. If the movable supporting block includes at least one of a ceramic and a glass so that a difference in thermal expansion coefficient between the movable supporting block and the second optical fiber is kept small, a thermal stress of at least one of the movable supporting block and the second optical fiber is restrained.

If a permanent magnet generates another magnetic flux sufficient for maintaining the movable supporting block at a selected or desired either one of the first and second positions when the magnetic flux generator is prevented from generating the magnetic flux, a so-called latching or self-hold of the optical switch when being deenergized is obtained. If the another magnetic flux passes through the stationary supporting block, the another magnetic flux effectively supplied to the movable supporting block. If the another magnetic flux passes through both of the stationary supporting block and the movable supporting block, the another magnetic flux effectively utilized for the latching or self-hold of the optical switch or the movable supporting block.

If the magnetic flux generated by the magnetic flux generator passes through both of the stationary supporting block and the movable supporting block, the magnetic flux effectively supplied to the movable supporting block. It is preferable for improving the effective supply of the magnetic flux to the movable supporting block that the stationary supporting block includes at least one of a soft magnetic (feeble magnetism) substance and a ferromagnetic or ferromagnetism substance so that the magnetic flux passes through the stationary supporting block. If the stationary supporting block and the movable supporting block includes a common soft magnetic (feeble magnetism) substance, differences in thermal deformation (expansion and contraction) and magnetic characteristic between the stationary supporting block and the movable supporting block is made small.

If the magnetic flux generator includes a first magnetic flux generator and a second magnetic flux generator, a direction of the magnetic flux (magnetic pole direction) generated by the first magnetic flux generator is opposite to a direction of the magnetic flux (magnetic pole direction) generated by the permanent magnet in a magnetic circuit including the movable supporting block (facing to or arranged between first and second front yoke (or core) portions of soft magnetism (feeble magnetism) opposite or facing to each other), the first magnetic flux generator, the first front yoke portion and the permanent magnet while a direction of the magnetic flux (magnetic pole direction) generated by the second magnetic flux generator is equal to the direction of the magnetic flux (magnetic pole direction) generated by the permanent magnet in a magnetic circuit including the movable supporting block, the second magnetic flux generator, the second front yoke portion and the permanent magnet, so that the movable supporting block moves from the first position to the second position by being drawn toward the second front yoke portion, and the direction of the magnetic flux (magnetic pole direction) generated by the first magnetic flux generator is equal to the direction of the magnetic flux (magnetic pole direction) generated by the permanent magnet in the magnetic circuit including the movable supporting block, the first magnetic flux generator, the first front yoke portion and the permanent magnet while the direction of the magnetic flux (magnetic pole direction) generated by the second magnetic flux generator is opposite to the direction of the magnetic flux (magnetic pole direction) generated by the permanent magnet in the magnetic circuit including the movable supporting block, the second magnetic flux generator, the second front yoke portion and the permanent magnet, so that the movable supporting block moves from the second position to the first position by being drawn toward the first front yoke portion.

The switching operation is performed securely by changing respectively the directions of the magnetic fluxes generated by the first and second magnetic flux generators with keeping the directions of the magnetic fluxes opposite to each other in the permanent magnet while the latching or self-hold of the optical switch is released as required.

If the magnetic flux generator includes first and second magnetic flux generators connected electrically in series, and a direction of the magnetic flux through the permanent magnet generated by the first magnetic flux generator in a magnetic circuit including the first magnetic flux generator, the permanent magnet, the stationary supporting block and the movable supporting block is opposite to a direction of the magnetic flux through the permanent magnet generated by the second magnetic flux generator in a magnetic circuit including the second magnetic flux generator, the permanent magnet, the stationary supporting block and the movable supporting block, the switching operation is performed by changing a direction of an electric current applied to the first and second magnetic flux generators through a pair of electric terminals between which the first and second magnetic flux generators is energized in series.

If a magnetically permeable member is connected magnetically to the permanent magnet and includes front portions facing to respective sides of the movable supporting block and being opposite to each other, a magnetic circuit including the permanent magnet and the movable supporting block is obtained with a decreased magnetic resistance. If the permanent magnet is arranged between the stationary supporting block and the magnetic flux generator in a magnetic flux proceeding direction, the permanent magnet is commonly used for the latching or self-hold at the first position and the latching or self-hold at the second position. If the stationary supporting block is arranged between the movable supporting block and the permanent magnet in a magnetic flux proceeding direction, the permanent magnet is prevented from arranged between the stationary supporting block and the movable supporting block while the permanent magnet is commonly used for the latching or self-hold at the first position and the latching or self-hold at the second position. Therefore, a friction between the movable supporting block and the permanent magnet is prevented.

It is preferable for improving a machinability of the movable supporting block and restraining the thermal stress of the movable supporting block and/or the first optical fiber that the soft magnetic (feeble magnetism) substance is an oxide ferrite. It is preferable for the oxide ferrite to include iron, manganese and zinc. For further improving the machinability of the movable supporting block, it is effective for the feeble magnetism substance to be a single crystalline ferrite.

If at least one guide pin is prevented from having a magnetic permeability when the guide pin contacts the stationary supporting block of feeble magnetism or ferromagnetism and the movable supporting block to guide a mutual movement of the stationary supporting block and the movable supporting block between the first and second positions, the mutual movement is not restrained by the guide pin.

If a distance between the stationary supporting block of at least one of feeble magnetism and ferromagnetism and the movable supporting block of feeble magnetism is kept substantially constant so that a magnetic gap or resistance between the stationary supporting block and the movable supporting block in a magnetic circuit including the stationary supporting block (which may include the permanent magnet), the magnetic flux generator and the movable supporting block is kept substantially constant although a magnetic gap or resistance between the magnetic flux generator (or the front yoke portion of feeble magnetism) and the movable supporting block in the magnetic circuit is variable, the movable supporting block is securely driven relative to the stationary supporting block by a stable degree of the magnetic flux.

DETAILED DESCRIPTION OF PREFERRED EMBODIMENTS

Figure 1:
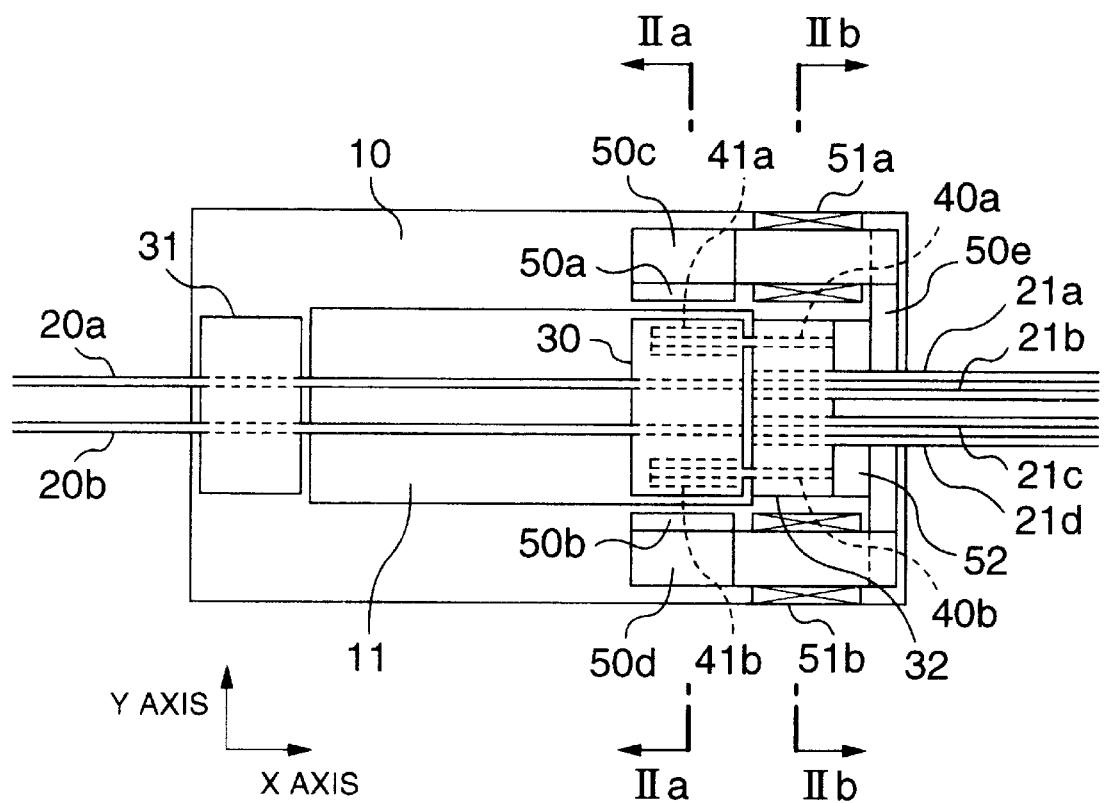
FIG. 1 is a partially cross-sectional view showing an optical switch according to the present invention.
Figure 3:
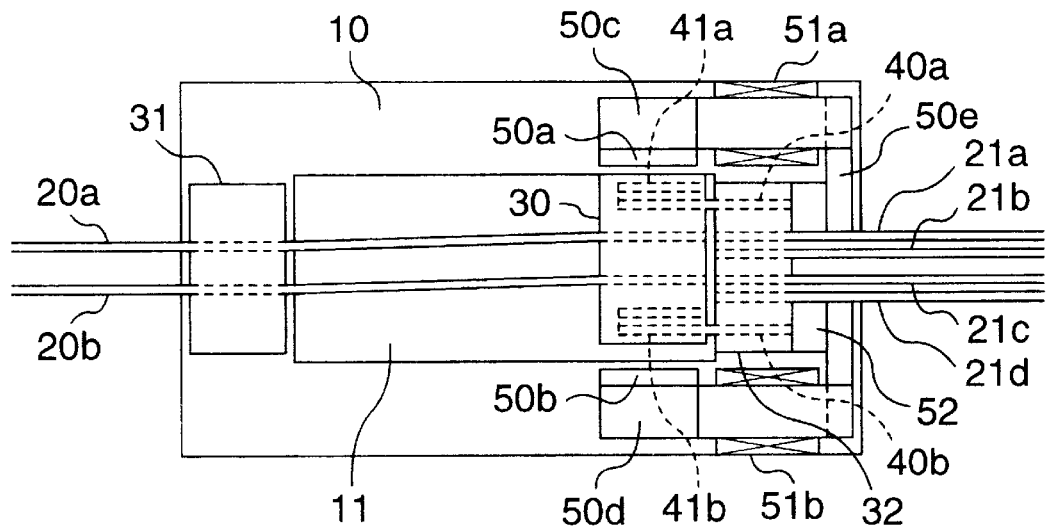
FIG. 3 is a partially cross-sectional view showing the optical switch in a first position of the movable optical fiber movable holder.

As shown in FIGS. 1 and 3, movable optical fibers 20a and 20b are supported on a movable optical fiber stationary holder 31 made of a soft magnetic (feeble magnetism) ceramic and a movable optical fiber movable holder 30 made of the soft magnetic ceramic. The soft magnetic ceramic used in this embodiment is a Manganese/Zinc ferrite with a saturation magnetic flux density of 4700 G (minimum value is 3000 G), a magnetic permeability of 1200 at 1 MHz, and a thermal expansion coefficient of 115×10−7/° C.

Figure 2A:
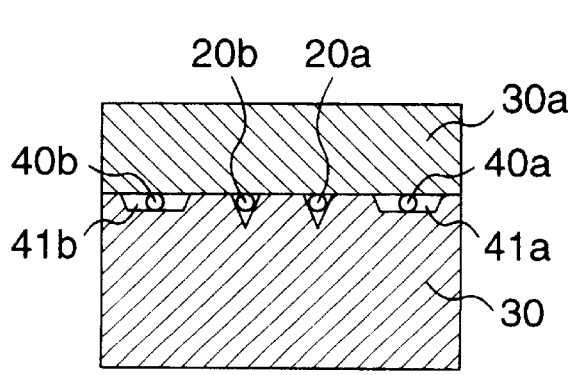
FIG. 2a is a cross-sectional view of a movable optical fiber movable holder taken along IIa—IIa in FIG. 1.

As shown in FIG. 2a, the movable optical fibers 20a and 20b are supported between V-shaped grooves of the movable optical fiber movable holder 30 and a pressing plate 30a fixed onto the movable optical fiber movable holder 30 and made of a glass or the soft magnetic ceramic whose thermal expansion coefficient is substantially equal to a thermal expansion coefficient of the movable optical fiber movable holder 30. The V-shaped grooves are formed accurately through a dicing process. The movable optical fibers 20a and 20b are supported on the movable optical fiber stationary holder 31 in a manner similar to this V-shaped-grooves-and-pressing-plate supporting structure. The movable optical fiber stationary holder 31 fixed to a base plate 10 made of a ceramic or steel supports fixedly the movable optical fibers 20a and 20b at intermediate parts of the movable optical fibers 20a and 20b, and the movable optical fiber movable holder 30 movable relative to the base plate 10 in a hole 11 of the base plate 10 supports the movable optical fibers 20a and 20b at forward or terminating ends of the movable optical fibers 20a and 20b. When the base plate 10 is made of steel, non-magnetically permeable (for example, glass) plate is preferably arranged between the base plate 10 and the holders 30 and 31. Alternatively, a magnetic clearance for restraining sufficiently a magnetic flux leakage from the holders 30 and 31 toward the base plate 10 may be arranged between the base plate 10 and the holders 30 and 31.

Figure 2B:
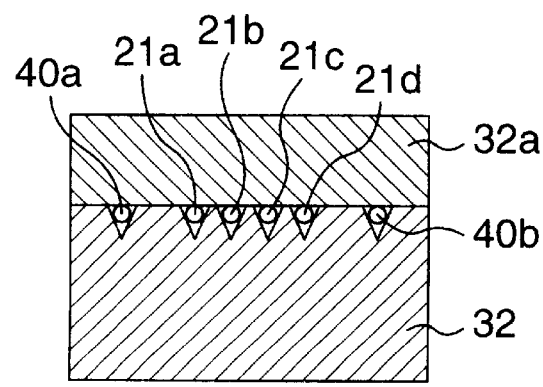
FIG. 2b is a cross-sectional view of a stationary optical fiber holder taken along IIb—IIb in FIG. 1.

A stationary optical fiber holder 32 faces to the movable optical fiber movable holder 30 in a direction (X axis direction) substantially parallel to longitudinal axes of the movable optical fibers 20a and 20b and stationary optical fibers 21a, 21b, 21c and 21d while the longitudinal axes are substantially parallel to each other at least on the stationary optical fiber holder 32 and the movable optical fiber movable holder 30, and is fixed to the base plate 10 to support thereon the stationary optical fibers 21a, 21b, 21c and 21d at forward or terminating ends of the stationary optical fibers 21a, 21b, 21c and 21d, in such a manner that each of the forward or terminating ends of the stationary optical fibers 21a, 21b, 21c and 21d can face to each of the forward or terminating ends of the movable optical fibers 20a and 20b in the direction. As shown in FIG. 2b, the stationary optical fibers 21a, 21b, 21c and 21d are supported between V-shaped grooves of the stationary optical fiber holder 32 and a pressing plate 32a fixed onto the stationary optical fiber holder 32 and made of a glass or the soft magnetic ceramic whose thermal expansion coefficient is substantially equal to a thermal expansion coefficient of the stationary optical fiber holder 32.

Non-magnetic guide pins 40a and 40b made of a cemented carbide metal are also supported between the V-shaped grooves of the stationary optical fiber holder 32 and the pressing plate 32a, and are movably fitted in respective positioning holes 41a and 41b formed by the movable optical fiber movable holder 30 and the pressing plate 30a to determine positional and attitudinal relationships between the movable optical fiber movable holder 30 and the stationary optical fiber holder 32 so that the movable optical fiber movable holder 30 moves in Y axis direction between a first position (the guide pins 40a and 40b contact first side walls of the positioning holes 41a and 41b ) at which the longitudinal axis of the movable optical fiber 20a is substantially identical to that of the stationary optical fiber 21a and the longitudinal axis of the movable optical fiber 20b is substantially identical to that of the stationary optical fiber 21c on the stationary optical fiber holder 32 and the movable optical fiber movable holder 30 and a second position (the guide pins 40a and 40b contact second side walls of the positioning holes 41a and 41b opposite to the first side walls) at which the longitudinal axis of the movable optical fiber 20a is substantially identical to that of the stationary optical fiber 21b and the longitudinal axis of the movable optical fiber 20b is substantially identical to that of the stationary optical fiber 21d on the stationary optical fiber holder 32 and the movable optical fiber movable holder 30. Therefore, a transmission loss of light between the movable optical fibers 20a and 20b and the stationary optical fibers 21a, 21b, 21c and 21d is limited to a significantly low degree. Longitudinal ends of the guide pins 40a and 40b contact longitudinal ends of the positioning holes 41a and 41b respectively so that a distance between the movable optical fiber movable holder 30 and the stationary optical fiber holder 32 in a longitudinal direction of the optical fibers is kept constant.

Figure 6A:
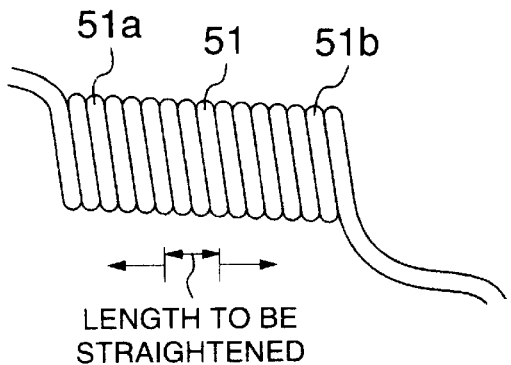
FIG. 6a is a schematic view showing an electromagnetic coil to be divided into a pair of electromagnetic coils connected electrically in series as the claimed first and second magnetic flux generators.

A U-shaped magnetic yoke includes a pair of front yoke portions 50a and 50b fixed onto the base plate 10 and including a soft magnetic (feeble magnetism) iron, a base yoke portion 50e fixed onto the base plate 10 and including the soft magnetic iron, and a pair of side yoke portions 50c and 50d including the soft magnetic iron and extending along respective longitudinal axes between the front yoke portions 50a and 50b and the base yoke portion 50e. The movable optical fiber movable holder 30 is arranged between the front yoke portions 50a and 50b. An electromagnetic coil 51a surrounds the longitudinal axis of the side yoke portion 50c, and an electromagnetic coil 51b surrounds the longitudinal axis of the side yoke portion 50d. The stationary optical fiber holder 32 is magnetically connected to the base yoke portion 50e through a permanent magnet 52 including a neodymium-iron-boron compound. As shown in FIG. 6a, a single coil winding may be divided by straightening an intermediate length thereof into the electromagnetic coils 51a and 51b connected electrically in series.

Figure 4A:
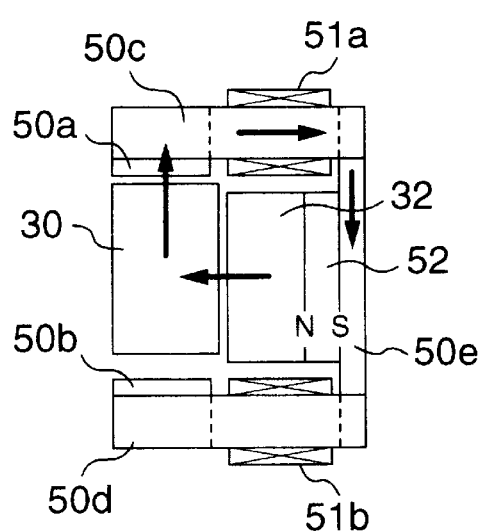
FIG. 4a is a schematic view of an actuator of the optical switch including the movable optical fiber movable holder, the stationary optical fiber holder, a permanent magnet, a U-shaped yoke and electromagnetic coils surrounding respective side yoke portions, in the first position of the movable optical fiber holder.

As shown in FIG. 4a, when the movable optical fiber movable holder 30 is at the first position, a magnetic flux generated by the permanent magnet 52 passes through the stationary optical fiber holder 32, the movable optical fiber movable holder 30, the front yoke portion 50a, the side yoke portion 50c and the base yoke portion 50e, and returns to the permanent magnet 52 so that the movable optical fiber movable holder 30 is drawn toward the front yoke portion 50a to be maintained at the first position even if the electromagnetic coil 51a does not accelerate the magnetic flux generated by the permanent magnet 52 or both of the electromagnetic coils 51a and 51b are not energized.

Figure 4B:
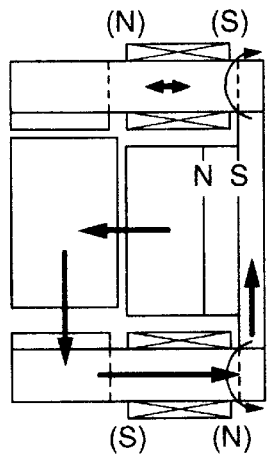
FIG. 4b is a schematic view of the actuator as seen when the movable optical fiber holder is moving from the first position to a second position.
Figure 4C:
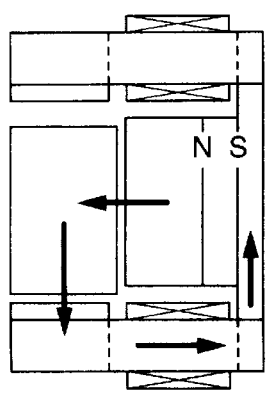
FIG. 4c is a schematic view of the actuator in the second position of the movable optical fiber holder.

As shown in FIG. 4c, when the movable optical fiber movable holder 30 is at the second position, the magnetic flux generated by the permanent magnet 52 passes through the stationary optical fiber holder 32, the movable optical fiber movable holder 30, the front yoke portion 50b, the side yoke portion 50d and the base yoke portion 50e, and returns to the permanent magnet 52 so that the movable optical fiber movable holder 30 is drawn toward the front yoke portion 50b to be maintained at the second position even if the electromagnetic coil 51b does not accelerate the magnetic flux generated by the permanent magnet 52 or both of the electromagnetic coils 51a and 51b are not energized.

As shown in FIG. 4b, when the movable optical fiber movable holder 30 is being moved from the first position to the second position, the magnetic flux generated by the permanent magnet 52 passes through the stationary optical fiber holder 32, the movable optical fiber movable holder 30, the front yoke portion 50b, the side yoke portion 50d and the base yoke portion 50e, is amplified, accelerated or increased by the electromagnetic coil 51b being energized while the electromagnetic coil 51a is energized to prevent or restrain the magnetic flux from passing through the side yoke portion 50c and the electromagnetic coil 51a or to weaken a magnetization of the front yoke portion 50a [that is, a magnetic pole direction (direction of magnetic flux or N-S polarity direction) of the permanent magnet 52 is equal to that of the electromagnetic coil 51b in a magnetic circuit including the permanent magnet 52, the stationary optical fiber holder 32, the movable optical fiber movable holder 30, the front yoke portion 50b, the side yoke portion 50d and the base yoke portion 50e, and is against or opposite to that of the electromagnetic coil 51a in another magnetic circuit including the permanent magnet 52, the stationary optical fiber holder 32, the movable optical fiber movable holder 30, the front yoke portion 50a, the side yoke portion 50c and the base yoke portion 50e], and returns to the permanent magnet 52 so that the movable optical fiber movable holder 30 is moved toward the second position from the first position. When the directions of the magnetic fluxes (magnetic pole directions, that is, N-S polarity directions) of the electromagnetic coil 51a and 51b are inverted respectively relative to the above described directions of the magnetic fluxes (magnetic pole directions) thereof, the movable optical fiber movable holder 30 is moved from the second position to the first position. In this embodiment, the change between the first and second position is performed within 10 msec by energizing each of the electromagnetic coil 51a and 51b with an electric current of 50 mA.

Figure 6B:
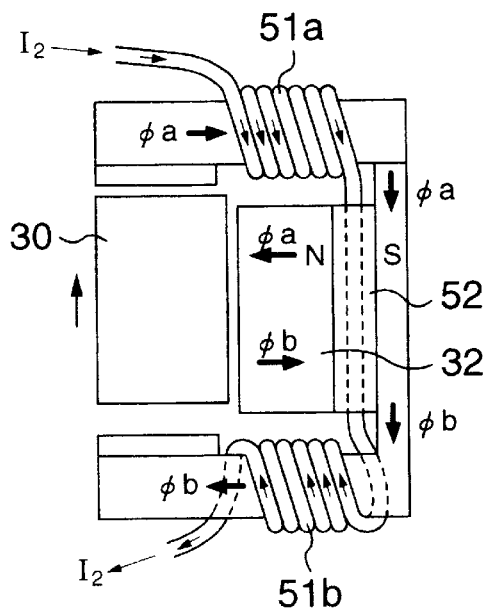
FIG. 6b is a schematic view showing a magnetic flux flow for moving a movable optical fiber movable holder from a second position to a first position.
Figure 6C:
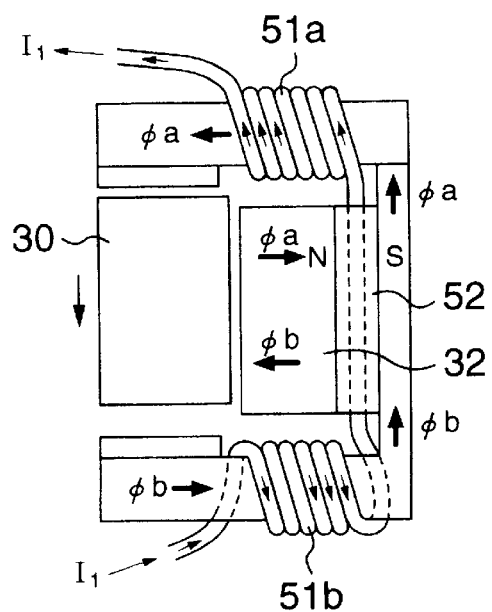
FIG. 6c is a schematic view showing a magnetic flux flow for moving the movable optical fiber movable holder from the first position to the second position.

As shown in FIGS. 6b and 6c, by changing a direction of an electric current to be applied to the electromagnetic coils 51a and 51b connected electrically in series, the movable optical fiber movable holder 30 is driven between the first and second position, because a direction of the magnetic flux through the permanent magnet 52 and the stationary optical fiber holder 32 generated by the electromagnetic coil 51a in a magnetic circuit including the electromagnetic coil 51a, the movable optical fiber movable holder 30, the permanent magnet 52 and the stationary optical fiber holder 32 is opposite to a direction of the magnetic flux through the permanent magnet 52 and the stationary optical fiber holder 32 generated by the electromagnetic coil 51b in a magnetic circuit including the electromagnetic coil 51b, the movable optical fiber movable holder 30, the permanent magnet 52 and the stationary optical fiber holder 32.

The movable optical fiber movable holder 30 and the stationary optical fiber holder 32 may be formed any of various soft magnetic (feeble magnetism) ceramics which can be machined finely and have thermal expansion coefficients closer to the thermal expansion coefficient of the optical fibers in comparison with soft magnetic (feeble magnetism) metals. It is preferable for the thermal expansion coefficients of the movable optical fiber movable holder 30 and the stationary optical fiber holder 32 to be substantially equal to each other so that the stationary optical fibers 21a, 21b, 21c and 21d is prevented from shifting relative to the movable optical fibers 20a and 20b in accordance with temperature variation. When the thermal expansion coefficient of both the movable optical fiber movable holder 30 and the stationary optical fiber holder 32 is $115 \times 10-7/°$ C., the transmission loss of light between the movable optical fibers 20a and 20b and the stationary optical fibers 21a, 21b, 21c and 21d is −0.5 dB in a temperature range between −20° C. and +80° C.

When the pressing plates are formed of the soft magnetic ceramic, the movable optical fiber movable holder 30 and/or the stationary optical fiber holder 32 may be formed of a glass or silicon of a non-magnetic material. The positioning holes 41a and 41b may be rectangular or trapezoidal, and may be formed by grooves formed on each of the pressing plate 30a and the movable optical fiber movable holder 30. The movable optical fiber movable holder 30 and/or the stationary optical fiber holder 32 may be received by a tube shaped container as a substitute of the base plate 10. The grooves for receiving the optical fibers and the guide pins may be formed through etching process.

Figure 5A:
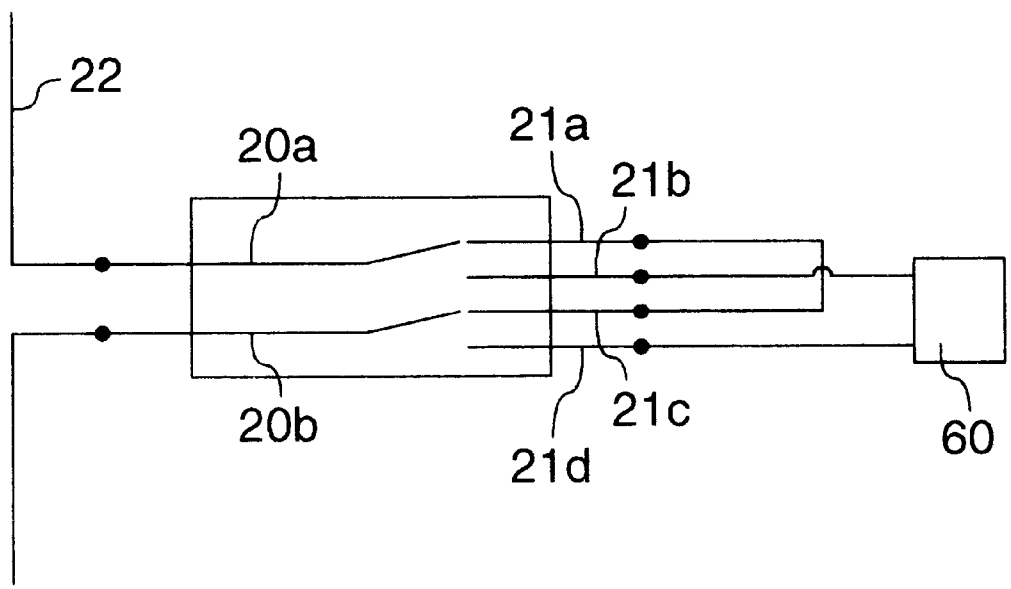
FIG. 5a is a schematic view showing an optical fiber connection obtainable in the first position of the movable optical fiber holder.
Figure 5B:
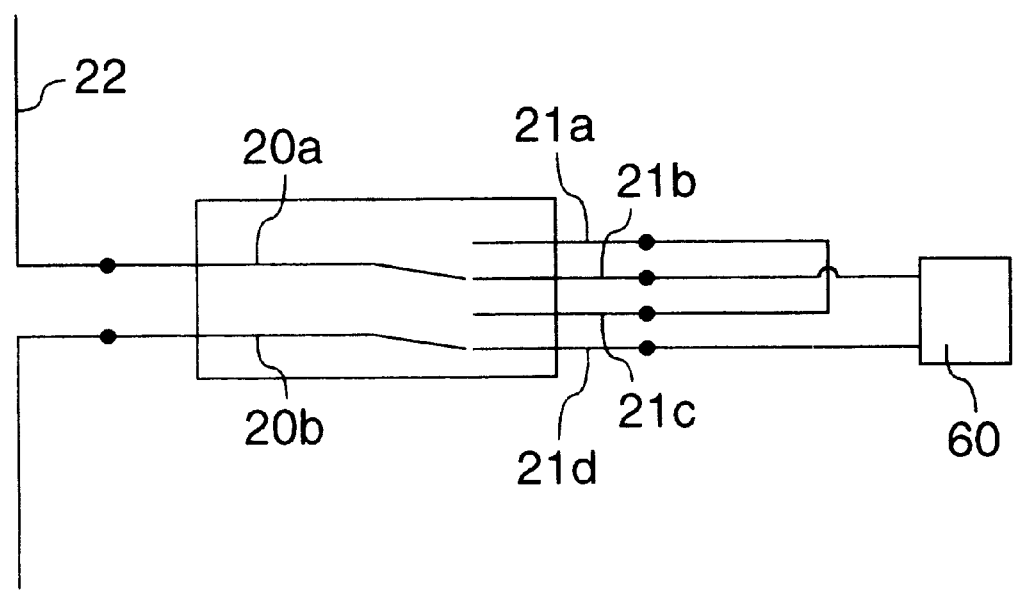
FIG. 5b is a schematic view showing an optical fiber connection obtainable in the second position of the movable optical fiber holder.

As shown in FIGS. 5a and 5b, the optical switch of the present invention can perform a switching operation of an optical path 22 relative to an AMD (add drop multiplexer) element 60. The AMD element 60 may be replaced by various optical signal receivers.

What is claimed is:

1. An optical switch for connecting optically at least one first optical fiber to at least one second optical fiber selectively, comprising, a stationary supporting block for supporting thereon a terminating end of the first optical fiber, a movable supporting block for supporting thereon a terminating end of the second optical fiber, being movable relative to the stationary supporting block between a first position for the optical connection between the terminating ends of the first and second optical fibers and a second position for disconnecting the optical connection therebetween, and being adjacent to the stationary supporting block, and a magnetic flux generator for generating a magnetic flux for moving the movable supporting block relative to the stationary supporting block, wherein the movable supporting block includes a soft magnetic substance so that the magnetic flux passes through the movable supporting block.

2. An optical switch according to claim 1, wherein the soft magnetic substance is a soft magnetic ceramic.

3. An optical switch according to claim 1, wherein a thermal expansion coefficient of the stationary supporting block is substantially equal to that of the movable supporting block.

4. An optical switch according to claim 1, wherein the stationary supporting block includes at least one of a ceramic and a glass so that a difference in thermal expansion coefficient between the stationary supporting block and the first optical fiber is kept small.

5. An optical switch according to claim 1, wherein the movable supporting block includes at least one of a ceramic and a glass so that a difference in thermal expansion coefficient between the movable supporting block and the second optical fiber is kept small.

6. An optical switch according to claim 1, further comprising a permanent magnet for generating another magnetic flux sufficient for maintaining the movable supporting block at a selected one of the first and second positions when the magnetic flux generator is prevented from generating the magnetic flux.

7. An optical switch according to claim 6, wherein the another magnetic flux passes through the stationary supporting block.

8. An optical switch according to claim 7, wherein the another magnetic flux passes through both of the stationary supporting block and the movable supporting block.

9. An optical switch according to claim 1, wherein the magnetic flux generated by the magnetic flux generator passes through both of the stationary supporting block and the movable supporting block.

10. An optical switch according to claim 1, wherein the stationary supporting block includes at least one of a soft magnetic substance and a ferromagnetic substance so that the magnetic flux passes through the stationary supporting block.

11. An optical switch according to claim 1, wherein the stationary supporting block and the movable supporting block includes a common soft magnetic substance.

12. An optical switch according to claim 6, wherein the magnetic flux generator includes a first magnetic flux generator and a second magnetic flux generator, a direction of the magnetic flux generated by the first magnetic flux generator is opposite to a direction of the magnetic flux generated by the permanent magnet in a magnetic circuit including the movable supporting block, the first magnetic flux generator and the permanent magnet while a direction of the magnetic flux generated by the second magnetic flux generator is equal to the a direction of the magnetic flux generated by the permanent magnet in a magnetic circuit including the movable supporting block, the second magnetic flux generator and the permanent magnet, so that the movable supporting block moves from the first position to the second position, and the direction of the magnetic flux generated by the first magnetic flux generator is equal to the direction of the magnetic flux generated by the permanent magnet in the magnetic circuit including the movable supporting block, the first magnetic flux generator and the permanent magnet while the direction of the magnetic flux generated by the second magnetic flux generator is opposite to the direction of the magnetic flux generated by the permanent magnet in the magnetic circuit including the movable supporting block, the second magnetic flux generator and the permanent magnet, so that the movable supporting block moves from the second position to the first position.

13. An optical switch according to claim 6, further comprising a magnetically permeable member connected magnetically to the permanent magnet and including front portions facing to respective sides of the movable supporting block and being opposite to each other.

14. An optical switch according to claim 6, wherein the permanent magnet is arranged between the stationary supporting block and the magnetic flux generator in a magnetic flux proceeding direction.

15. An optical switch according to claim 6, wherein the stationary supporting block is arranged between the movable supporting block and the permanent magnet in a magnetic flux proceeding direction.

16. An optical switch according to claim 1, wherein the soft magnetic substance is an oxide ferrite.

17. An optical switch according to claim 16, wherein the oxide ferrite includes iron, manganese and zinc.

18. An optical switch according to claim 1, wherein the soft magnetic substance is a single crystalline ferrite.

19. An optical switch according to claim 1, wherein the stationary supporting block includes a ceramic having at least one of soft-magnetism and ferromagnetism.

20. An optical switch according to claim 1, further comprising at least one guide pin contacting the stationary supporting block and the movable supporting block to guide a mutual movement of the stationary supporting block and the movable supporting block between the first and second positions, and the guide pin is prevented from having a magnetic permeability.

21. An optical switch according to claim 1, wherein a distance between the stationary supporting block of at least one of soft-magnetism and ferromagnetism and the movable supporting block of soft-magnetism is kept substantially constant so that a magnetic gap between the stationary supporting block and the movable supporting block is kept substantially constant.

22. An optical switch according to claim 6, wherein the magnetic flux generator includes first and second magnetic flux generators connected electrically in series, and a direction of the magnetic flux through the permanent magnet generated by the first magnetic flux generator in a magnetic circuit including the first magnetic flux generator, the permanent magnet, the stationary supporting block and the movable supporting block is opposite to a direction of the magnetic flux through the permanent magnet generated by the second magnetic flux generator in a magnetic circuit including the second magnetic flux generator, the permanent magnet, the stationary supporting block and the movable supporting block.

* * * * *